United States Patent
Palus et al.

(10) Patent No.: US 6,180,153 B1
(45) Date of Patent: Jan. 30, 2001

(54) METHOD AND APPARATUS FOR CHEESE BLOCK FORMING WITH VACUUM SEPARATED TOWER SECTIONS

(75) Inventors: Joseph J. Palus, Plymouth; Blake A. Halderson, Valders, both of WI (US)

(73) Assignee: Stoelting, Inc., Kiel, WI (US)

( * ) Notice: Under 35 U.S.C. 154(b), the term of this patent shall be extended for 0 days.

(21) Appl. No.: 09/429,155

(22) Filed: Oct. 28, 1999

(51) Int. Cl.[7] .............. A23C 19/00; A01J 25/00
(52) U.S. Cl. .............. 426/517; 99/454; 99/456; 99/458; 426/491; 426/582
(58) Field of Search .............. 426/512, 517, 426/486, 491, 495, 582; 99/454, 456, 458; 425/85, 147

(56) References Cited

U.S. PATENT DOCUMENTS

| | | | |
|---|---|---|---|
| 4,049,838 | 9/1977 | Krueger et al. | 426/478 |
| 4,061,794 | 12/1977 | Charles | 426/486 |
| 4,108,058 | 8/1978 | Sjoholm et al. | 99/466 |
| 4,130,053 | 12/1978 | Sjoholm et al. | 99/466 |
| 4,152,101 | 5/1979 | Charles | 425/85 |
| 4,237,781 | 12/1980 | Charles | 99/454 |
| 4,309,941 | 1/1982 | Brockwell | 99/453 |
| 4,420,296 | 12/1983 | Anderson | 425/444 |
| 4,539,902 | 9/1985 | Brockwell et al. | 99/454 |
| 4,744,203 | 5/1988 | Brockwell et al. | 53/512 |
| 5,001,972 | 3/1991 | Greenfield et al. | 99/454 |
| 5,146,845 | 9/1992 | Pittelko | 99/454 |
| 5,175,014 | 12/1992 | Brockwell et al. | 426/582 |
| 5,209,943 | 5/1993 | Pittelko | 426/582 |
| 5,572,925 | 11/1996 | Van Pay et al. | 99/154 |

FOREIGN PATENT DOCUMENTS 818 140 A1  1/1998  (EP).

Primary Examiner—George C. Yeung
(74) Attorney, Agent, or Firm—Whyte Hirschboeck Dudek SC

(57) ABSTRACT

A method and apparatus for cheese block forming with vacuum separated tower sections is disclosed for use in producing large blocks of compressed cheese without having to halt delivery of cheese curd into the tower while discharging a block of cheese. The cheese block former has an upper tower section with an interior area for receiving a mixture of curd and whey under a negative pressure, and a lower tower section, also under a vacuum, for separating the whey from the mixture and pressing the remaining curd into a block of cheese. A vacuum separator is disposed between the upper and lower tower sections to allow the upper and lower sections to remain in fluid communication and, additionally, to allow different pressures therein. The vacuum separator thus provides for a continuous cheesemaking process.

31 Claims, 6 Drawing Sheets

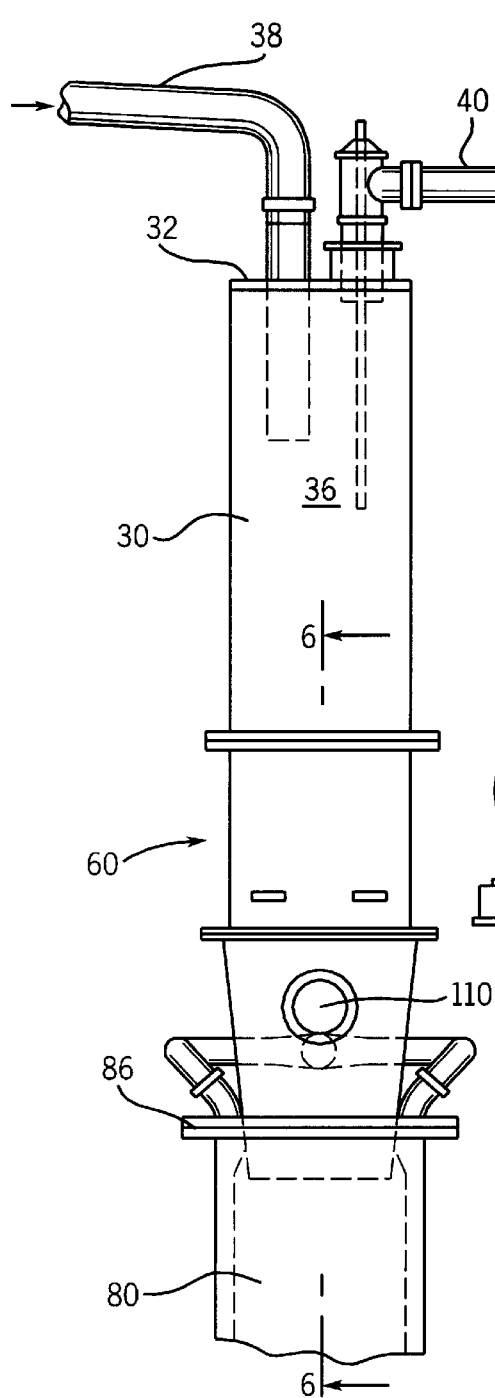
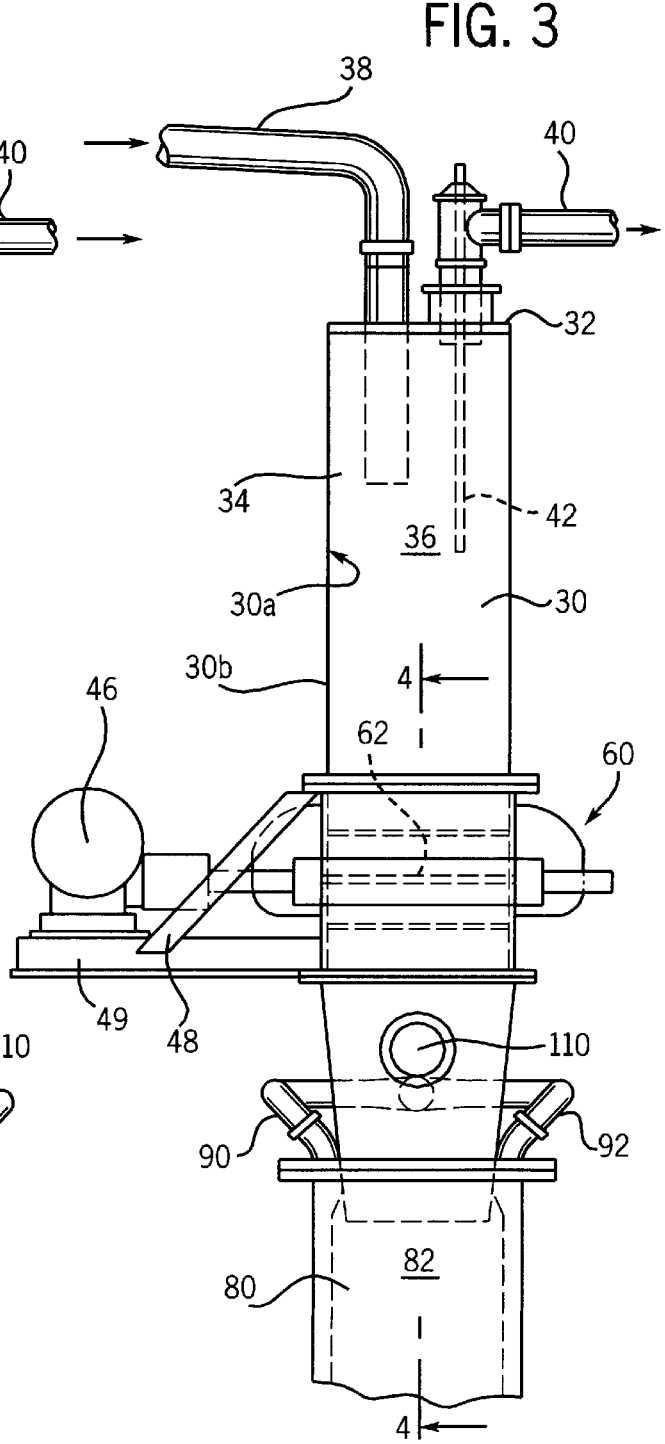

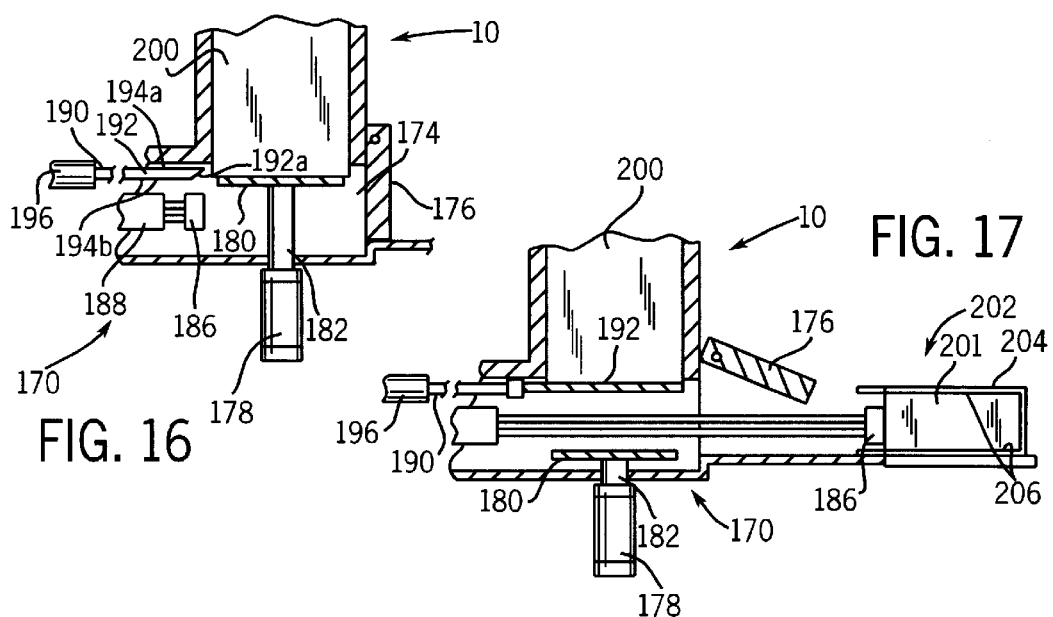
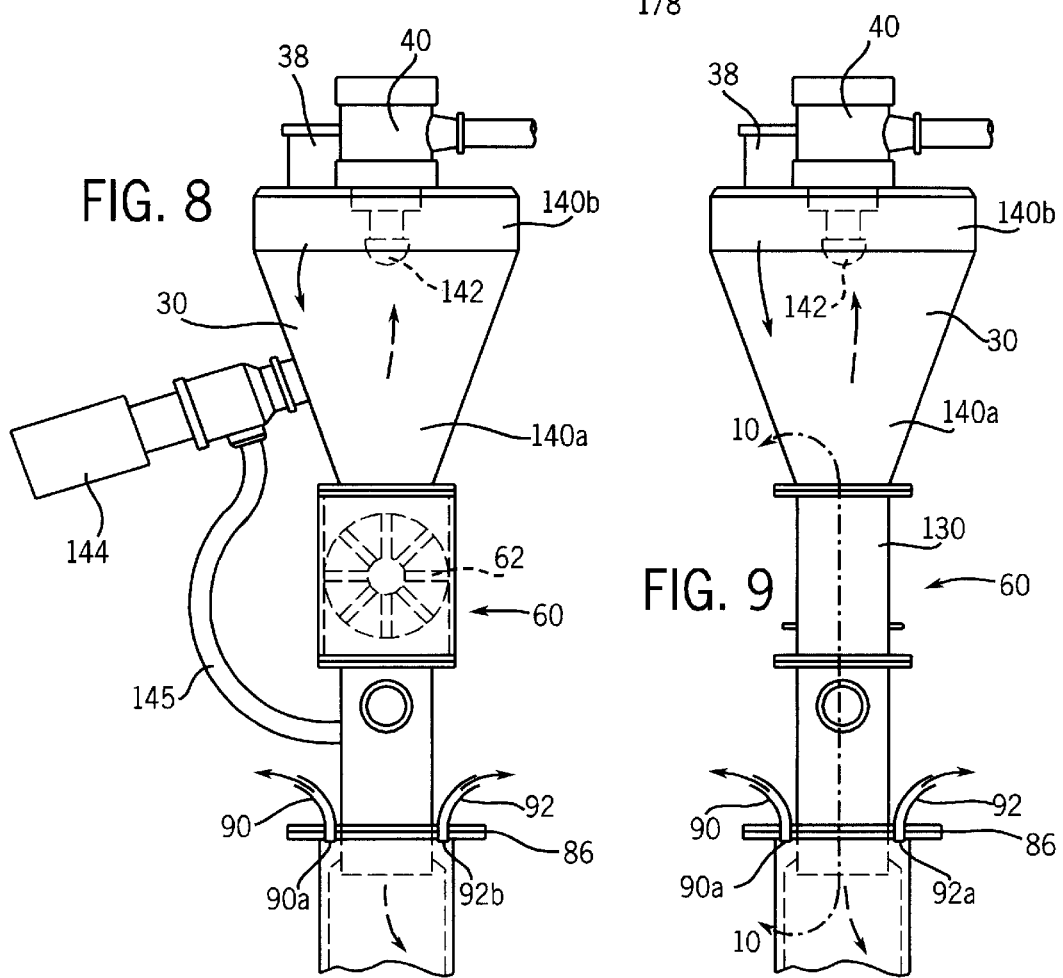

METHOD AND APPARATUS FOR CHEESE BLOCK FORMING WITH VACUUM SEPARATED TOWER SECTIONS

BACKGROUND OF THE INVENTION

The present invention relates generally to cheesemaking, and more particularly to a cheese block forming machine for continuously making compressed blocks of cheese with a tower having two sections capable of having different vacuum pressures simultaneously.

Cheese block formers are commonly used to produce large blocks of cheeses. They generally do so by providing a tower or column having a large interior area. At the top of the column, a mixture of curd and whey is fed into the column under a vacuum. As the mixture flows down through the column, the whey is drained out of the mixture and the curd, under its own weight, becomes a solid cheese pillar. At the bottom of the column, the pillar is cut into blocks using a cutting apparatus, such as a guillotine blade. The cheese is prepared for packaging and shipment.

To be effective, the machines must be rugged so as to minimize maintenance and labor expenses, efficient, and capable of producing a variety of cheese types (ie., cheddar, colby, monterey jack, mozzarella, brick or muenster). Further, the block formers must produce cheese blocks that have consistent weights from block to block and have a uniform moisture content. Finally, the block formers themselves should allow for independent operation, or for operation in conjunction with multiple cheese block formers.

There have been many attempts to properly mass-produce cheese blocks using large cheese block formers in the prior art, but most have fallen short in at least one of a number of categories. One example is that the prior art processes have not provided for continuous cheese block production. That is, when a cheese block is cut, the vacuum had to be shut off so as to accommodate the opening of the guillotine blade in preparation for cutting the cheese block. Once the vacuum was shut off, curd feed could not be drawn into the block former. After the guillotine was closed, the vacuum could be turned on again. However, time is required to achieve the vacuum necessary to allow curd feed to begin. Therefore, the prior art processes required a certain amount of downtime, and thus there lacked continuity in the cheese block forming processes. Further, downtime in general adds to production expenses and reduces overall efficiency.

Therefore, it would be desirable to have a cheese block former that solves the aforementioned problem, thus allowing large blocks of cheese to be produced continuously and without significant down time.

SUMMARY OF THE INVENTION

The present invention provides for an apparatus and method for cheese block forming with vacuum separated tower sections that overcomes the aforementioned problem.

In accordance with one aspect of the invention, the cheese block former has an upper tower section with an inner surface and an outer surface. The inner surface defines an interior area. The upper tower has a curd feed inlet at its top to allow curd to enter into the cheese block former. When the curd is inside the upper tower section, it comes in contact with the inner surface. The cheese block former also has a lower tower section that has inner and outer surfaces, as well as an interior area. The lower tower section is in fluid communication with the upper tower section, and has an inner screen along its inner surface. The inner screen is used to separate the whey from the cheese curd mixture under a vacuum. Finally, the upper tower section has a vacuum separator that serves to connect the upper and lower tower sections. The vacuum separator allows different pressures to exist simultaneously in the upper and lower tower sections to thereby provide continuous cheese block formation because as one block is being removed from the lower tower section, the upper tower section can be kept under high vacuum to draw in more cheese curd to keep the process operating continuously.

In accordance with another aspect of the invention, a cheese block former is disclosed to continuously make large blocks of bulk cheese from a cheese curd mixture, the block former again having an upper tower section. The upper tower section has top and bottom ends, inner and outer surfaces, and a curd feed inlet to allow curd to enter the interior area of the upper tower section. The block former also has a lower tower section having top and bottom ends. The block former further has separate vacuum sources for the upper and lower tower sections as well as a vacuum separator to permit different pressures to exist simultaneously in the upper and lower tower sections. The lower tower section also has at least one removeable perforated plate extending from the top to the bottom of the section. And finally, the lower tower section has a flange through which vacuum is provided.

In accordance with another aspect of the invention, a method for continuously making blocks of cheese is disclosed. A mixture of curd and whey are fed into an opening at the top of the upper tower section. The mixture is drawn into the tower by providing a vacuum source to the upper section of the tower. The whey is separated from the curd in a lower tower section by providing another vacuum source to the lower tower section. The whey is drained from the cheese through an area between a perforated whey separation screen and an inner surface of the lower tower section. The vacuum source of the upper tower section is separated from the vacuum source of the lower tower section. A solid cheese column is formed from the curd by applying pressure from the weight of the cheese column. Properly sized blocks of solid cheese are obtained while simultaneously feeding additional curd mixture into the upper tower section.

Accordingly, one object of the present invention is to provide a cheese block former which can continuously produce cheese blocks by providing a vacuum separation means between two sections of a cheese block former.

Another object of the invention is to provide a cheese block former which can produce larger cheese blocks of a variety of cheeses in a sanitary, efficient and reliable way by allowing a block of cheese to be discharged while at the same time drawing in fresh cheese curd.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 3 is a detailed view of one embodiment of a top portion of FIG. 1 having a straight-through upper tower and a rotary valve.

FIG. 5 is a detailed view of another embodiment of a top portion of FIG. 1 having a straight-through upper tower without a rotary valve.

FIG. 8 is a detailed view of a top portion of FIG. 1 having a cyclone-type hopper and a rotary valve.

FIG. 9 is a detailed view of a top portion of FIG. 1 having a cyclone-type hopper and with the straight-through chute of FIG. 7.

FIG. 16 is a schematic cross-sectional view of a portion of a cheese block tower showing the lowering of the cheese within the tower.

FIG. 17 is a schematic cross-sectional view of a portion of the cheese block tower showing the discharging of a cheese block.

DETAILED DESCRIPTION OF THE PREFERRED EMBODIMENT

Figure 1:
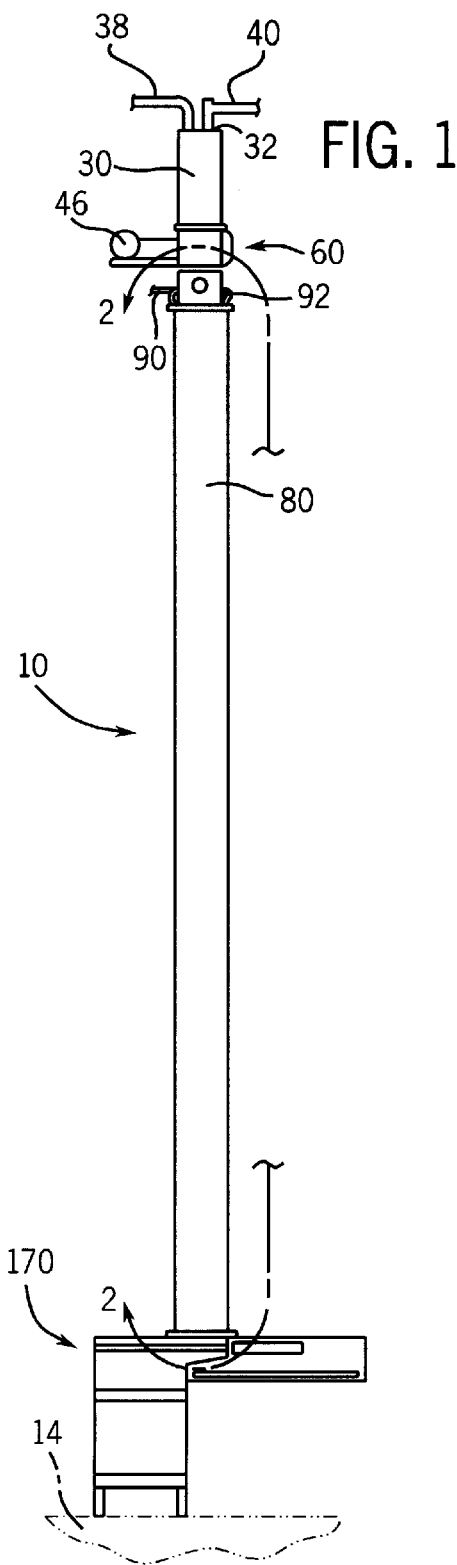
FIG. 1 is an elevational front view of a cheese block former according to one aspect of the invention.

FIG. 1 shows a cheese block former 10 according to the present invention situated on a finishing section 170, which itself is mounted on a base 14. The cheese block former is shown having a lower tower section 80, a vacuum separator 60, and an upper tower section 30. The vacuum separator provides a vacuum separation between the upper and lower tower sections. The tower has a curd feed inlet tube 38 on an upper end 32 to supply curd feed into the upper end 32 of the cheese block former 10. A vacuum port 40 is provided in the upper end 32 of the upper tower section 30 to draw curd into the cheese block former 10. The lower tower section 80 has vacuum ports 90 and 92 that are used to draw whey from the curd, as will be described in detail hereinafter. In a preferred embodiment, separate vacuum sources (not shown) provide the vacuum to vacuum port 40 and vacuum ports 90 and 92. A motor 46 is located on the vacuum section and drives a rotary star valve 62 (FIG. 4) according to one preferred embodiment of the invention.

Figure 2:
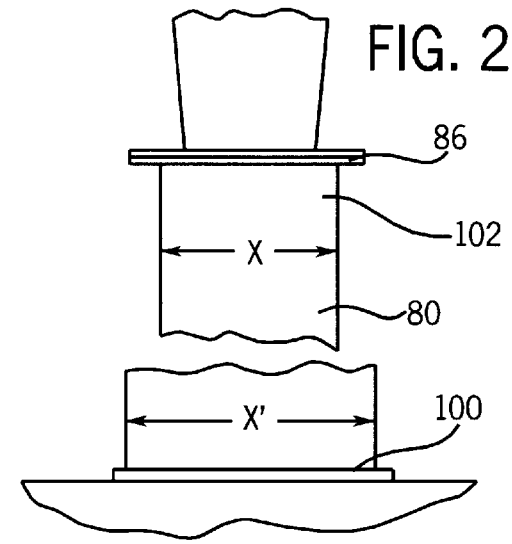
FIG. 2 is a detailed schematic view of a portion of FIG. 1 taken along line 2—2 of FIG. 1.

FIG. 2 illustrates a sectioned schematic view taken along line 2—2 of FIG. 1 to show a taper in the lower tower section 80. As indicated, a bottom end 100 has a wider cross section than a top end 102 which has a more narrow cross-section. The taper from the flange 86 to the bottom end 100 is provided to supply blocks of cheese of desired size and at the same time, limit the amount of curd entering the lower tower section 80.

Referring to FIG. 3, the upper tower section 30 of the cheese block former 10 is shown in greater detail. The upper tower section 30 extends from an upper end 32 to the vacuum separator 60, and has an inner surface 30a and outer surface 30b which define an interior area 36. In this embodiment, the upper tower section 30 is shown with a rectangular-shaped hopper 34, which has a cheese curd inlet 38 for allowing cheese curd to enter the upper tower section 10 under a vacuum supplied via a vacuum port 40 which is connected to a vacuum source (not shown). A curd level indicator 42 is attached to the upper end 32 about the vacuum port 40. A motor 46 is positioned adjacent the upper tower section 10 and is mounted with supports 48 and 49. The motor 46 operates a valve 62 within the vacuum separator 60 and is preferable a 1 HP motor. Below the vacuum separator 60, the lower tower section 80 is partially shown. Two separate vacuum lines 90 and 92, each connected to a vacuum source (not shown) to draw whey from the curd in an enlarged vacuum chamber 88 (which will be discussed in detail later).

Figure 4:
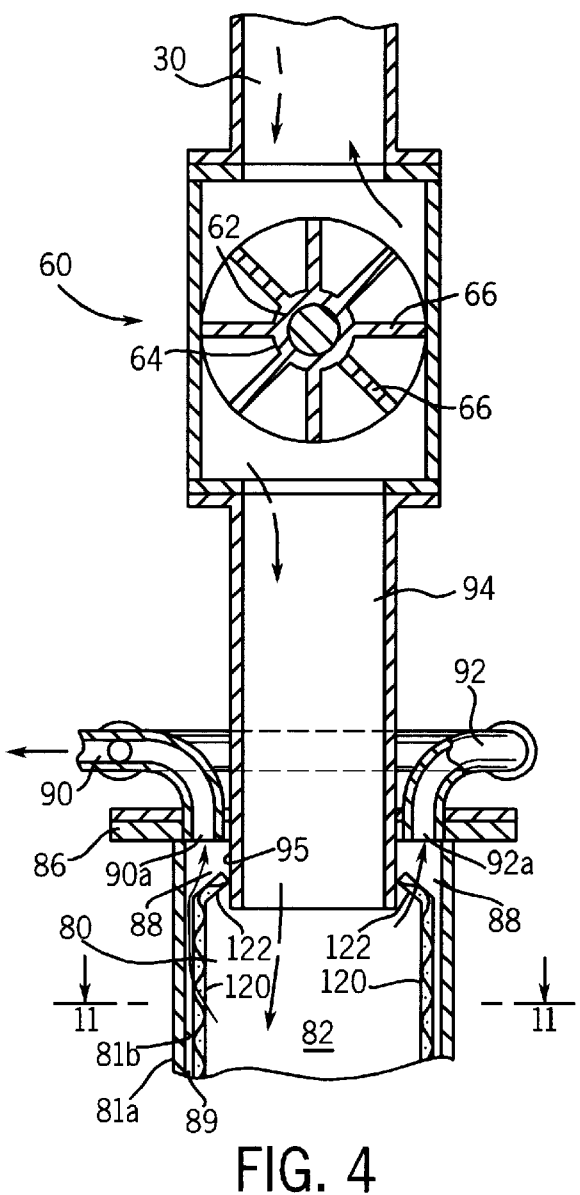
FIG. 4 is a partial cross-sectional view taken along line 4—4 of FIG. 3.

FIG. 4 shows a detailed view of one embodiment of the vacuum separator 60. In this embodiment, the vacuum separator 60 includes a rotary star valve 62 having a plurality of vanes 66 that rotate about a center hub 64 to provide a vacuum separation between the upper tower section 30 and the lower tower section 80 such that cheese block former 10 continuously can operate with different pressures in the upper and lower tower sections simultaneously. The plurality of vanes 66 rotate to transfer curd to the lower tower section 80. Tower section 80 has an outer surface 80a and an inner surface 80b, the inner surface defining an interior area 82 extending down below the flange 86 into the lower tower section 80.

Vacuum lines 90 and 92 are connected between vacuum sources (not shown) and to the interior area 82 of the lower tower section 80 through the flange 86 via vacuum inlets 90a and 92a. FIG. 4 also shows an inner whey separation screen 120 disposed along the inner surface 81b of the lower tower portion 80 below the flange 86. The inner whey separation screen 120 further has a tapered upper portion 122 to create a vacuum chamber 88 below the flange 86 and between the tapered portion, the inner surface 81b, and the outer surface 95 of the extension chamber 94 that extends from the vacuum separator. All of these features are described and shown in greater detail in FIG. 10.

The motor 46, FIG. 3, is mechanically connected to drive the rotary star valve 62, FIG. 4, during the operation of the cheese tower 10. The vanes 66 of the rotary star valve 62 rotate to maintain the upper tower section 30 and the lower tower section 80 at separate pressures at all times in order to discharge cheese blocks at the finishing section 170 while drawing fresh cheese curd into the upper tower simultaneously. It should be noted that the upper and lower tower sections are allowed to remain in fluid communication with one another as the cheese block forming process proceeds. That is, as the vanes 66 turn, cheese is transferred from the upper tower 30 to the lower tower 80, where the whey is drawn from the curd.

Figure 6:
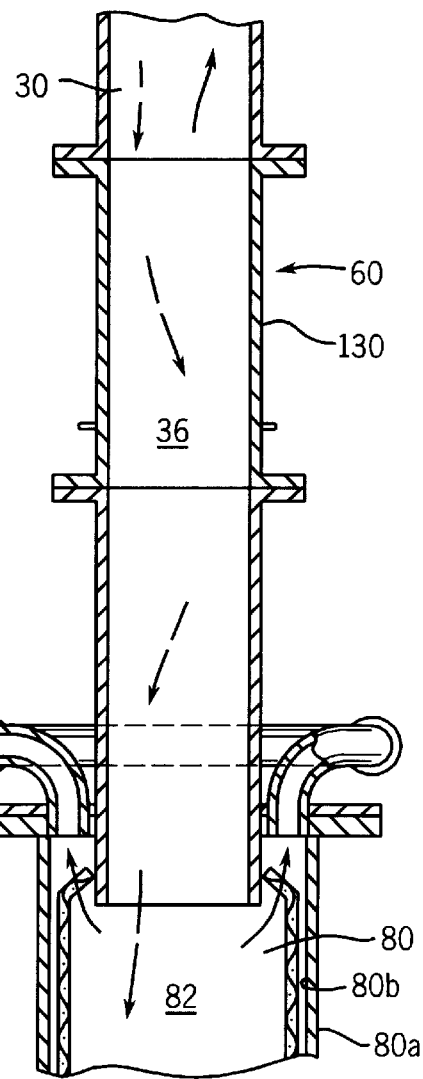
FIG. 6 is a partial cross-sectional view taken along line 6—6 of FIG. 5.

FIGS. 5 and 6 show an alternate embodiment of the upper tower section 30 with a rectangular-shaped top 34 having an interior area 36, similar to FIGS. 3 and 4. Also depicted are the vacuum separator 60 and part of the lower tower section 80. Here, however, the rotary star valve 62 has been replaced with a straight-through chute 130. The straight-through replacement chute 130, like the rotary star valve 62, allows for fluid communication between the upper tower section 30 and the lower tower section 80, but without requiring a movable mechanism such as the star valve 62 and motor 46. It is understood that the straight-through chute disclosed and claimed herein may include a rectangular, circular, or oval-shaped chute, a cylinder, a tube, or any other similar type hollow material conveying apparatus. FIGS. 3 and 5 also show a viewing window 110 for inspecting the cheese curd mixture (not shown) after it passes through the vacuum separator 60.

Figure 7:
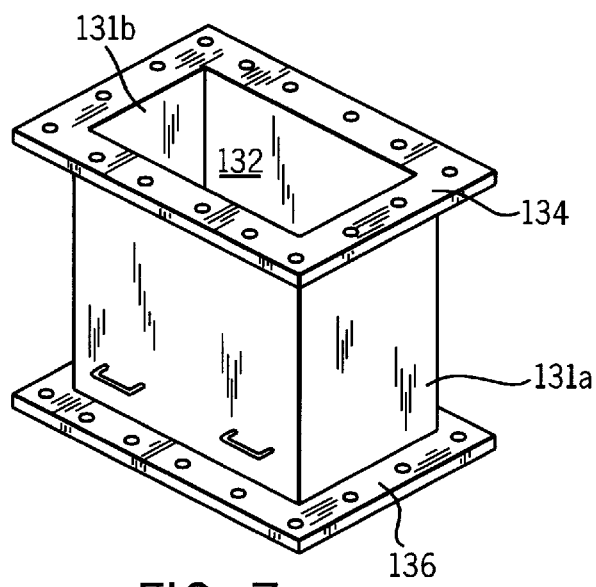
FIG. 7 is an isometric view of a straight-through chute in accordance with one aspect of the invention.

FIG. 7 illustrates an isometric view of the rectangular straight-through chute 130 used to replace the rotary star valve 62 discussed above. The chute 130 comprises a top flange 134 and bottom flange 136 to facilitate attachment of the chute into position within the tower 10. Further, the chute 130 has an outer surface 131a and an inner surface 131b, the surfaces extending between the top flange 134 and the bottom flange 136. The inner surface 131b defines an interior area 132 through which a mixture of cheese curd and whey (not shown) may flow. Together, the chute 130 and the mixture, which contacts the inner surface 131b provide an effective vacuum separator between the upper tower section 30 and the lower tower section 80.

FIG. 8 illustrates a detailed view of the top portion of FIG. 1. Here, however, another preferred embodiment is shown. The cheese block former 10 has a cyclone hopper 140. The cyclone hopper has a conical portion 140a and a cylindrical portion 140b, the cyclone hopper connected to cheese curd inlet 38 and vacuum port 40. The cyclone hopper is installed on top of the vacuum separator 60, which comprises a rotary star valve 62 of the type discussed earlier. Vacuum ports 90a and 90b in the lower tower section 80 are also shown and they function for the purpose discussed previously. Also shown is a clean-in-place (CIP) sprayer 144 which is connected to the upper tower section 30 cyclone hopper 140 and just below the vacuum separator 60 via line 145 so as to flush and rinse the tower 10, bypassing the rotary star valve 62. CIP sprayer 142 (shown in dashed lines) facilitates cleaning of the cyclone hopper 140.

FIG. 9 shows a detailed view of FIG. 1 again with the optional cyclone hopper 140 attached to the block former 10. Here, however, the rotary star valve 62 has been replaced with the straight-through chute 130 as previously described (FIG. 7). In this preferred embodiment, the CIP sprayer 144 (FIG. 8) is not required, and thus, is not shown.

Figure 10:
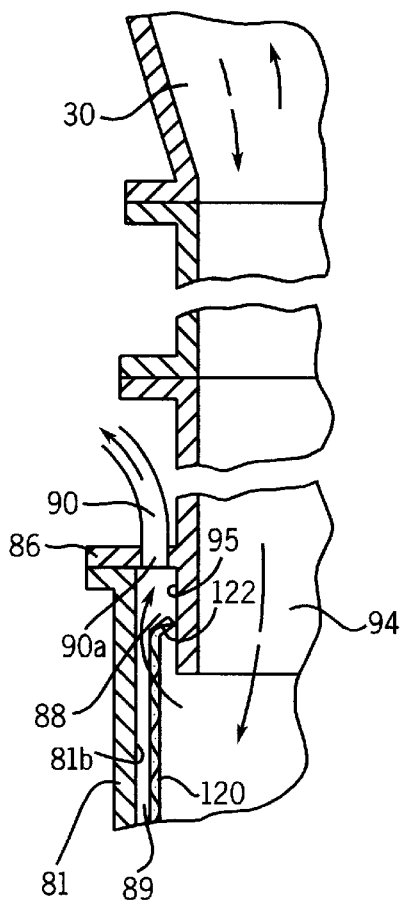
FIG. 10 is a detailed sectional view of a portion of FIG. 9 taken along line 10—10 of FIG. 9.

Referring to FIG. 10, an enlarged sectional view along line 10—10 indicates in greater detail the arrangement of the whey separation screen 120 within the lower tower section 80. The whey separation screen 120 is disposed along the inner surface 81b of the lower tower section outer wall 81, with a whey drainage area 89 therebetween. Further, the whey separation screen 120 has an inwardly tapered portion 122, the screen tapering above and toward extension section 94 wall 95, which extends down below the flange 86. As noted earlier with reference to FIG. 4, the enlarged vacuum chamber 88 is located above the whey drainage area 89, but below the flange 86 and between the inner screen tapered portion 122, the lower section inner surface 81b, and the outer surface 95 of the extension chamber 94 that extends from the vacuum separator 60.

FIG. 10 illustrates the enlarged vacuum chamber 88 connected to the vacuum port 90a at the top of the whey drainage area 89 which provides for optimal removal of whey from the cheese curd mixture in the lower tower section 80.

Figure 11:
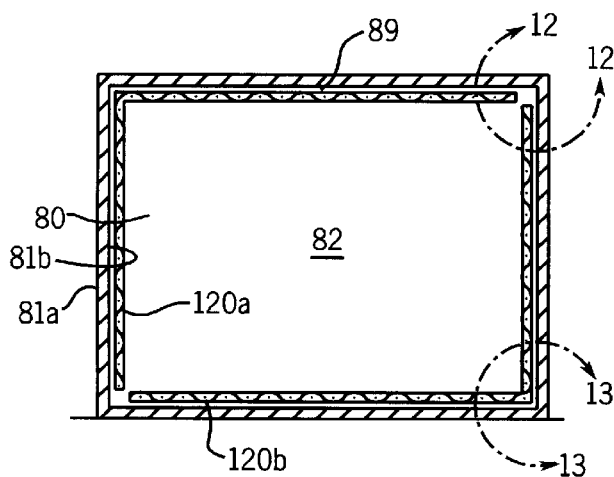
FIG. 11 is a cross-section of the lower tower taken along line 11—11 of FIG. 4.

Referring to FIG. 11, a cross-section of the lower tower portion 80 taken along line 11—11 is shown. The lower tower section 80 has an outer wall 81 with an outer surface 81a and an inner surface 81b. Shown here is that disposed along the inner surface 81b is the inner screen 120 having two distinct portions 120a and 120b, configured to remain unmated such that a rectangular cross-section is formed when the two halves 120a and 120b are inserted for use in the lower tower. The inner whey separation screen 120, along with the inner surface 81b, defines a whey drainage area 89 therebetween, the vacuum drainage area extending from the top end of the lower tower section 102 to the bottom end of the lower tower section 100. The whey drainage area provides a space for whey to be removed from the cheese curd mixture 16.

Additionally, when the screen sections 120a and 120b are put in place such that they surround the interior area 82 of the lower tower section 80, the size of the cross-section of the screen increases along the axial length of the lower tower portion from top to bottom. Therefore, the walls of the screen 120 are inclined outward at a small angle relative to the axis of the tower 10 in a downward direction (see FIG. 2).

Figure 12:
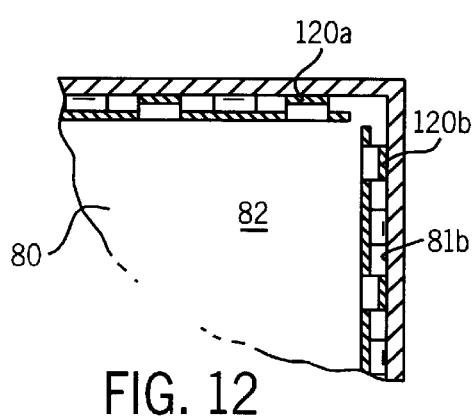
FIG. 12 is a detailed view of a portion of FIG. 11 taken along line 12—12 of FIG. 11.

FIG. 12 is a detailed view of the whey separation screen 120 taken along line 12—12 of FIG. 11. Screen 120 is formed of two disjointed sections, 120a and 120b, which are disposed along the inner surface 81b of the lower tower section 80.

Figure 13:
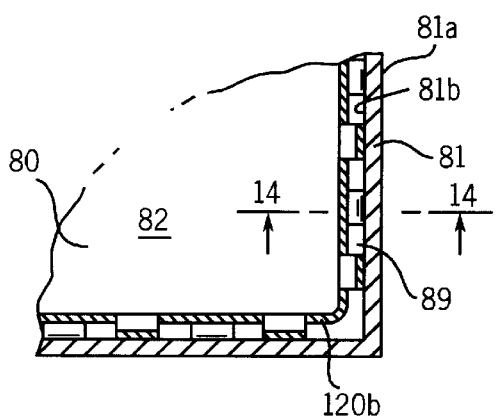
FIG. 13 is a detailed view of a portion of FIG. 11 indicated by line 13—13 of FIG. 11.

FIG. 13 illustrates a detailed view of the inner whey separation screen indicated by line 13—13 of FIG. 11. The screen portion 120b is bent to conform to two sides of the rectangular-shaped inner surface 81b of the lower tower section 80.

Figure 14:
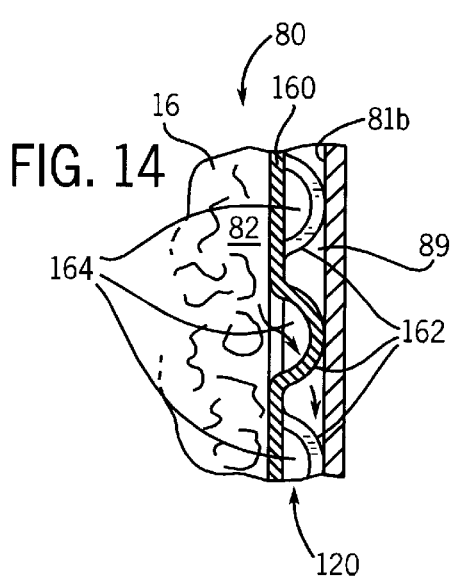
FIG. 14 is a detailed cross-sectional view of a portion of FIG. 13 taken along line 14—14 of FIG. 13.

Referring to FIG. 14, a cross-sectional view taken along line 14—14 of FIG. 13, the inner whey separation screen 120 is shown to have a flat base portion 160 and a plurality of protrusions 162 disposed along the entire area of the screen. The whey separation screen 120 covers substantially the entire inner surface 81b of the lower tower section 80. The protrusions 162 form open areas 164 in the screen 120 providing fluid communication so as to allow whey to pass from the cheese curd mixture 16 in the interior area of the lower tower section 82 through the screen and into the whey drainage area 89.

Figure 15:
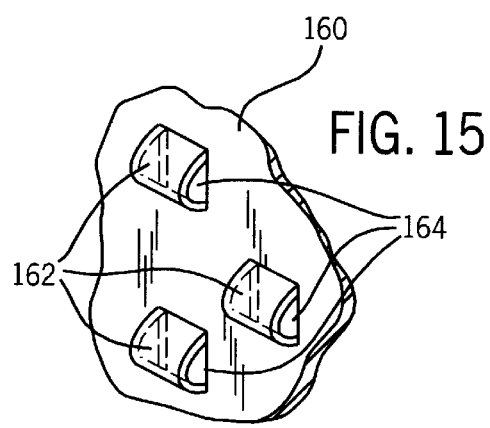
FIG. 15 is a partial isometric detailed view of a portion of FIG. 14.

FIG. 15 shows an isometric detail of the inner screen 120 so as to more clearly indicate its features. The screen 120 has a flat base portion 160, a plurality of protrusions of the kind indicated by 162 and open areas such as 164 formed in the base portion underneath the protrusions.

Referring to FIGS. 16 and 17, a finishing section 170 is shown having an inner chamber 174, an elevator 178 having an elevator platform 180 and a lifting mechanism 182 such as a piston. Also shown is an ejection ram 186, a guillotine apparatus 190 and a bottom portion 198 of a column of cheese 200. An access door 176 which pivots between an open position (FIG. 16) and a closed position (FIG. 17) is also shown. The finishing section provides a sanitary area in which cheese block cutting, pressing, and packaging can take place. The guillotine apparatus 190 is comprised, in part, of a single linearly moveable blade 192 defined by a cutting edge 192a, a top surface 194a, and a bottom surface 194b. Piston 196 is used to actuate blade 192 which is moveable from a first position in which the opening at the bottom of the cheese block former 10 is closed off to a second position in which the opening at the bottom of the cheese block former 10 is unobstructed. In a preferred embodiment, the cutting edge 192a is beveled adjacent the top surface 194a to facilitate cheese cutting.

Again referring to FIGS. 16 and 17, an elevator 174 is positioned within the inner chamber 174 of the finishing section 170 below the block former 10. The elevator 174 is operable by a piston 182 to move the elevator platform 96 along a path which is coaxial with the cheese block former and the cheese column 200. A linearly moving ejection ram 186, operable by a piston 188, is also located within the interior chamber 174. The ram 186 is aligned to extend through the cheese block 200 and the access door 176 when the ram is in the extended position and the access door is open (FIG. 17). Located outside of the inner chamber 174 and the adjacent access door 176 is a bag loader 202 which, when used, serves to hold a bag 204 for receipt of cheese blocks as they are ejected from the inner chamber 174. Once a bag 204 has been filled with a cheese block, the bagged cheese block is released from the bag loader 202 and is then transported to another processing station (not shown).

The operation of the cheese block former 10 will now be described. At the start of the operational cycle, the guillotine blade 192 is in its closed position. A vacuum source 39(shown schematically in FIG. 18) is used to evacuate the air through the vacuum port 40 such that a negative pressure is formed within the block former 10. When a sufficiently high vacuum is obtained, the difference between the low pressure in the upper tower section 30 and the comparatively high atmospheric pressure acting on the curd in the curd source block 37, FIG. 18, causes curd to flow into the interior area 36. Curd flow can be stopped via curd feed check valve(not shown) when the curd level reaches a desired height as determined by sensing probe 42.

The curd is then drawn down through the vacuum separator 60, which in the preferred embodiments, comprises either a rotary star valve 62 or a straight-through replacement chute 130. Below the vacuum separator 60, the curd is drawn into the lower tower section 80. In the rotary star valve embodiment, the motor 46 is actuated to move curd to the lower tower section 80. In the straight-through chute embodiment, curd is transported by gravity feed.

Figure 18:
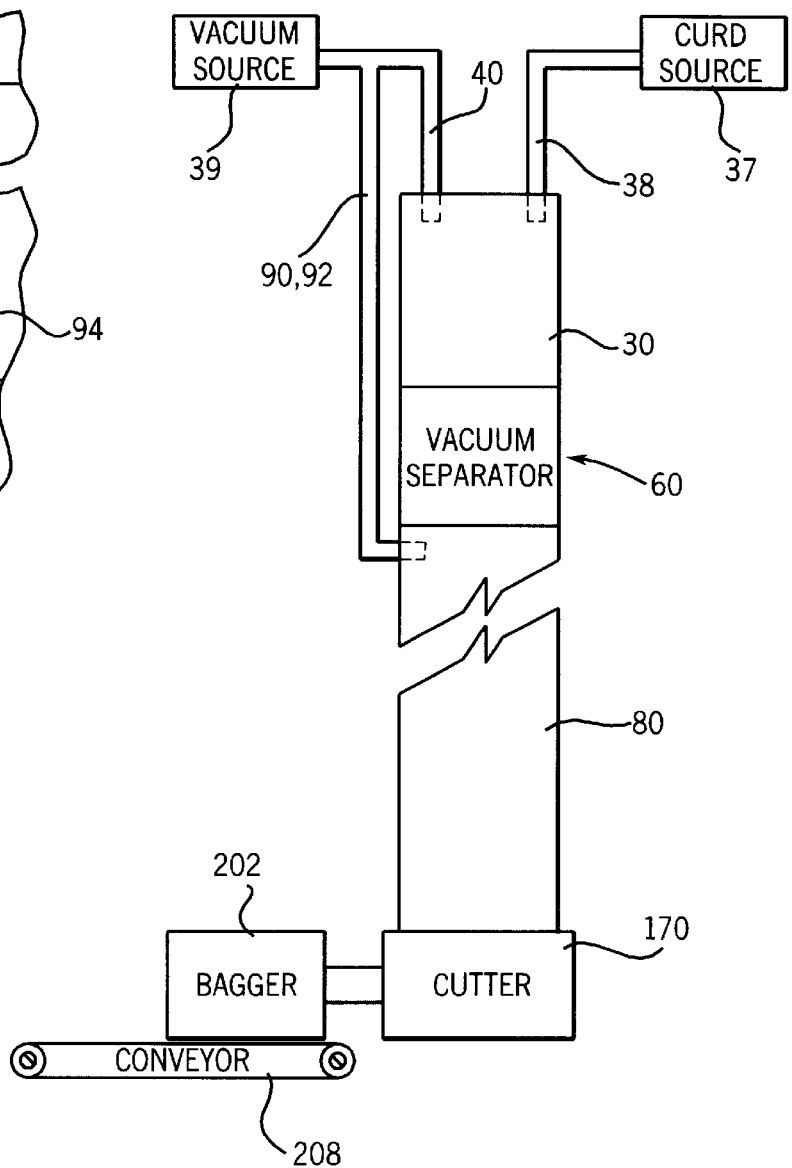
FIG. 18 is a schematic block diagram of a cheese block former system according to the present invention.

Separate vacuum ports 40 and 90 (shown in FIG. 18) are connected to a vacuum source 39, FIG. 18. The whey is drawn from the curd into the open areas 128 of the screen 120 by the vacuum from ports 90a and 92a. The vacuum ports 90a and 92a extract whey and air from the vacuum chamber 96 and from the cheese curd mixture through the open areas 164 and into the enlarged vacuum chamber. The whey drains out of the tower through the drainage area 89 below the enlarged vacuum chamber 88. Also, the weight of the curd within the tower compresses the curd even further to force whey out of the curd through the inner whey separation screen. Whey is then removed from the drainage area via whey drainage ports(not shown).

The base of the column of cheese rests on the top surface 194a of the guillotine blade 192. At the top of the lower tower section 80, the inner screen 120 is tapered inside an enlarged vacuum chamber 96 just below the flange 86 where the vacuum ports 90a and 92a are connected. As whey is drained from the curd, the weight of the curd and the resulting cheese begins to fuse the cheese into a continuous column.

When the column of curd in each tower has reached a predetermined height indicated by the tower's level probe 42, the curd feed control valve (not shown) automatically closes and the elevator platform 180 is raised to a position adjacent to and abutting the guillotine blade 192 so as to begin the cutting and discharge sequence. Next, the blade 192 is withdrawn to its open position to allow the column to drop down onto the elevator platform 180. Simultaneously, as the curd column is lowered, the curd feed control valve is automatically allowed to open to replenish the curd. This is accomplished because of the capability of providing the vacuum separator which allows different vacuum pressures in the upper and lower tower sections simultaneously.

The small outward pitch of the cheese block former 10 in the downward direction reduces the frictional resistance between the base portions 160 of the screen 120 and the curd during the downward movement of the column of curd. In the preferred embodiment, the lower tower section is provided with a 2 inch pitch, or in other words, the sides increase from a 9"×11" at the top end of the lower tower section 102 to 11"×14" at the bottom end of the lower tower section 100.

The curd is then lowered into the inner chamber 174 of the finishing section 170 by the elevator 178 to a distance corresponding to the desired depth, and hence weight, of the block of cheese being processed. Once sizing is completed, the guillotine blade 192 is returned to its closed position, and in doing so, the blade cuts the block of cheese from the lower end of the column of curd. Exact weight tolerances can be achieved by keying appropriate size information into an electronic block weight adjustment system which can be connected to the block former.

Next, the elevator 178 lifts the platform 180 so as to force the cheese block upward against the bottom surface 194 of the guillotine blade 192, thus pressing the cheese block for a predetermined amount of time. The bottom surface of the blade 192, the top surface of the elevator platform 180, an ejection ram 186 and the inner surface 176a of the access door 176 thus function as a mold for the cheese block. Molding provides the block with a finished surface that is suitable for packaging.

Once the cheese block is formed so as to be suitable for packaging, the access door 176 is opened and an ejection ram 186 is actuated so as to push the cheese block into an adjacent bag 204 inside a bag loader 202. The bag 204 has been positioned over trays 206 that have been spread apart to facilitate bagging, which is done using heat and under a vacuum. The cheese block 201 is then ready to be transported for shipment. The door 176 closes and the entire cycle is ready to be repeated.

FIG. 18 is a schematic diagram to generally indicate the way in which the cheese block former operates in conjunction with other mechanical systems in practice to produce a cheese block. A vacuum source 39, curd source 37, cutter 170, bagger 202 and conveyor 208 systems are shown as previously discussed. Of course the relative position of each mechanism is only exemplary.

The present invention has been described in terms of preferred embodiments, and it is recognized that equivalents, alternatives, and modifications, aside from those expressly stated, are possible and within the scope of the appended claims.

What is claimed is:

1. A cheese block former comprising:
    an upper tower section with an inner surface and an outer surface, the inner surface defining an interior area, the upper tower section further having a curd feed inlet to supply curd into the interior area of the upper tower section and wherein the interior area transports curd downwardly and out a lower end without a separation of whey from the curd;
    a lower tower section having an inner surface and an outer surface, the inner surface defining an interior area, the lower tower section in fluid communication with the upper tower section;
    a whey separation screen disposed only in the lower tower section to separate whey from the curd; and a vacuum separator connecting the upper tower section with the lower tower section such that different pressures can exist simultaneously in the upper and lower tower sections.

2. The cheese block former of claim 1 further comprising at least one vacuum source connected to the upper and lower tower sections to provide different pressures within the upper and lower tower sections.

3. The cheese block former of claim 2 further comprising a vacuum chamber located in the lower tower section between the inner screen and the inner surface of the lower tower section.

4. The cheese block former of claim 3 further comprising a vacuum inlet located in the lower tower section and in fluid communication with the vacuum chamber to extract whey from the curd.

5. The cheese block former of claim 2 further comprising a vacuum inlet located in the upper tower section, the vacuum inlet in communication with the vacuum source to assist in transporting curd.

6. The cheese block former of claim 1 wherein the upper tower section comprises a cyclone-type hopper.

7. The cheese block former of claim 1 wherein the upper tower is a rectangular-shaped hopper.

8. The cheese block former of claim 1 wherein the vacuum separator comprises a rotary valve.

9. The cheese block former of claim 1 wherein the vacuum separator comprises a straight-through tower chute which, together with a mixture of cheese curd and whey inside the straight-through chute, provide a vacuum separation between the upper and lower tower sections.

10. The cheese block former of claim 1 wherein the lower tower section has a top end and a bottom end and tapers outwardly from the top end to the bottom end.

11. The cheese block former of claim 1 wherein the outer surface of the lower tower section is substantially pyramidal.

12. The cheese block former of claim 1 wherein the whey separation screen comprises two separate portions and substantially conforms to the inner surface of the lower tower section.

13. The cheese block former of claim 1 wherein the screen is inwardly tapered near the top of the lower tower section.

14. The cheese block former of claim 1 further comprising a whey drainage area for draining whey from the curd, the drainage area being located in the lower tower section between the whey separation screen and the inner surface extending from the top end to the bottom end of the lower tower section.

15. The cheese block former of claim 14 wherein the inner screen comprises a base portion having a plurality of protrusions forming open areas in the inner screen to allow whey to pass through the screen into the whey drainage area and down through the tower and wherein the protrusions space the screen from the tower to form the whey drainage area.

16. A cheese block former for continuously making large blocks of bulk cheese from a cheese curd mixture, the block former comprising:

an upper tower section with a top end and a bottom end, an outer surface and an inner surface, the upper tower section further having a curd feed inlet to allow curd to enter the upper tower sections such that the curd is in contact with the inner surface of the upper tower section;

a lower tower section having a top end and a bottom end, an outer surface and an inner surface, the inner surface defining an interior area, the lower tower section in fluid communication with the upper tower section;

a vacuum source for providing or removing vacuum in the upper and lower tower sections to assist in transporting the curd mixture and removing whey from the curd mixture;

a vacuum separator connected between the upper and lower tower sections such that different pressures can exist simultaneously in the upper and lower tower sections;

a removable perforated plate for removing whey from the curd mixture, the plate extending substantially from the top end to the bottom end of the lower tower section of the block former; and a flange through which a vacuum inlet is provided, the vacuum inlet connected to the vacuum source.

17. The cheese block former of claim 16 wherein the upper tower portion comprises a cyclone-type hopper.

18. The cheese block former of claim 16 wherein the upper tower section comprises a top having a rectangularly-shaped profile.

19. The cheese block former according to claim 16 wherein the vacuum separator comprises a rotary valve.

20. The cheese block former of claim 16 wherein the vacuum separator comprises a straight-through chute which, together with a cheese curd mixture inside of the chute, provides a vacuum separation between the upper and lower tower sections.

21. The cheese block former of claim 16 wherein the upper tower section has a curd feed inlet for introducing curd feed into the upper portion of the feed inlet, the inlet having a curd feed control valve to allow or prevent the curd from entering into the upper tower portion when the curd reaches a prescribed height within the cheese block former.

22. The cheese block former of claim 16 wherein the perforated plate tapers inwardly near the top end of the lower tower portion so as to provide an enlarged vacuum chamber to improve removal of whey from the curd.

23. The cheese block former of claim 16 wherein the perforated plate and the inner surface of the lower tower section define a drainage area therebetween, the drainage area thus extending from the top end to the bottom end of the lower tower section.

24. The cheese block former of claim 16 further comprising a guillotine having a moving blade at the bottom end of the lower tower section which operates between a closed position in which the blade closes the lower end of the lower tower section and an open position in which the blade is withdrawn from the lower end of the lower tower section.

25. The cheese block former of claim 16 further comprising an elevator positioned below the lower end of the lower tower section.

26. The cheese block former of claim 16 further comprising a bagger for receiving and bagging a cheese block.

27. The cheese block former of claim 26 further comprising an ejector ram for pushing the cheese block into the bagger.

28. The cheese block former of claims 16 comprising a cheese block finishing section located below the lower tower section, the finishing section comprising:

an inner chamber for receiving the cheese block;

an elevator platform for lowering and pressing the cheese block;

an ejector for pushing the block out of the inner chamber;

an access door for allowing the cheese block to pass out of the inner chamber;

a bag loader for receiving and bagging the cheese block; and a conveyor for transporting the cheese block to another location.

29. A method for continuously making blocks of cheese comprising the steps of:
   feeding a mixture of curd and whey into an opening at a top of an upper tower section;
   drawing the mixture into the tower by providing a vacuum source to the upper tower section;
   separating whey from the [curd] mixture in a lower tower section by providing another vacuum source to the lower tower section;
   draining the whey away from the mixture through an area between a perforated screen and an inner surface of the lower tower section;
   separating the vacuum source in the upper tower section from the vacuum source in the lower tower section;
   forming a solid cheese column from the curd by applying pressure from the weight of the cheese column; and
   obtaining properly sized blocks of solid cheese while simultaneously feeding additional curd mixture into the upper tower section.

30. The method for continuously making blocks of cheese according to claim 29 wherein the step of drawing the mixture further comprises drawing the mixture through the upper tower section, and the lower tower section.

31. A cheesemaking system to make blocks of cheese comprising:
   a cheese block former having an upper tower section and a lower tower section, the upper and lower tower sections each having inner surfaces defining interior areas, the upper tower section in fluid communication with the lower tower section, the lower tower section having an inner screen disposed along the lower tower inner surface to remove whey from a curd mixture as it is drawn down from the upper tower section to the lower tower section, the removal of whey taking place in the lower tower section, the cheese block former further having a vacuum separator connecting the upper tower section with the lower tower section such that different pressures can exist simultaneously in the upper and lower tower sections;
   a curd mixture source for supplying a mixture of curd and whey to the cheese block former upper tower section through a curd feed inlet;
   at least one vacuum source to provide a vacuum for each of the upper and lower tower sections such that the upper and lower tower sections can exist at different pressures simultaneously;
   a cutter to cut cheese blocks, which are formed inside the cheese block former, to a desired size;
   a bagger to package cheese blocks; and
   a conveyor to transport cheese blocks to a desired location.

* * * * *